(12) United States Patent
Puckett et al.

(10) Patent No.: US 12,717,210 B2
(45) Date of Patent: Aug. 25, 2026

(54) APPARATUS AND METHOD FOR OPTICAL FREQUENCY CONVERSION

(71) Applicant: Honeywell International Inc., Charlotte, NC (US)

(72) Inventors: Matthew Wade Puckett, Phoenix, AZ (US); Chad Fertig, Roseville, MN (US); Luke Horstman, Saint Louis Park, MN (US); Jad Salman, Wayzata, MN (US); Ryan Patrick Shea, Elko New Market, MN (US); John Snyder, Edina, MN (US); Wei Charles Jiang, Vestal, NY (US)

(73) Assignee: Honeywell International Inc., Charlotte, NC (US)

( * ) Notice: Subject to any disclaimer, the term of this patent is extended or adjusted under 35 U.S.C. 154(b) by 280 days.

(21) Appl. No.: 18/521,258

(22) Filed: Nov. 28, 2023

(65) Prior Publication Data

US 2025/0172852 A1 May 29, 2025

(51) Int. Cl.

| | |
|---|---|
| ***G02F 1/377*** | (2006.01) |
| ***G02F 1/35*** | (2006.01) |
| ***G02F 1/355*** | (2006.01) |

(52) U.S. Cl.

CPC ............ *G02F 1/377* (2013.01); *G02F 1/3509* (2021.01); *G02F 1/3551* (2013.01)

(58) Field of Classification Search

CPC ....... G02F 1/377; G02F 1/3509; G02F 1/3551
See application file for complete search history.

(56) References Cited

U.S. PATENT DOCUMENTS

| | | | | |
|---|---|---|---|---|
| 5,295,218 A | | 3/1994 | Agostinelli et al. | |
| 5,434,700 A | * | 7/1995 | Yoo ........................ | B82Y 20/00 359/332 |
| 5,647,036 A | | 7/1997 | Deacon et al. | |

(Continued)

FOREIGN PATENT DOCUMENTS

| | | |
|---|---|---|
| CN | 101989024 A | 3/2011 |
| EP | 0287880 A1 | 10/1988 |
| JP | 2010066649 A | 3/2010 |

OTHER PUBLICATIONS

European Patent Office, "Extended European Search Report", dated Feb. 24, 2025, from EP Application No. 24198101.8, from Foreign Counterpart to U.S. Appl. No. 18/521,258, pp. 1 through 11, Published: EP.

(Continued)

*Primary Examiner* — Rhonda S Peace
(74) *Attorney, Agent, or Firm* — Fogg & Powers LLC

(57) ABSTRACT

Apparatuses and methods are provided for an optical frequency converter configured to double or have a carrier frequency of an input optical signal. The input optical signal provided to the optical frequency converter is a higher order mode than a mode of the output optical signal. The optical frequency converter comprises a core, cladding material, and a substrate. The core includes a first core portion of non-linear crystalline material which is non-centrosymmetric, and a second core portion and a third core portion of the non-linear crystalline material each of which is centrosymmetric. The first, the second, and the third core portions are coplanar with and adjacent to the first core portion between the second and the third core portions.

20 Claims, 3 Drawing Sheets

(56) References Cited

U.S. PATENT DOCUMENTS

| | | | | |
|---|---|---|---|---|
| 5,654,229 | A | 8/1997 | Leplingard et al. | |
| 6,295,402 | B1 * | 9/2001 | Nakamura | G02F 1/3515 385/24 |
| 7,170,671 | B2 | 1/2007 | Wu et al. | |
| 7,463,410 | B2 * | 12/2008 | Blau | G02F 1/3501 359/326 |
| 10,133,149 | B2 | 11/2018 | Timurdogan et al. | |
| 2012/0032080 | A1 * | 2/2012 | Koyama | G02F 1/353 359/326 |
| 2019/0137691 | A1 * | 5/2019 | Lin | G02B 6/1228 |
| 2022/0017547 | A1 | 1/2022 | Jang et al. | |
| 2022/0107546 | A1 | 4/2022 | Yap et al. | |
| 2022/0107547 | A1 * | 4/2022 | Yap | G02F 1/377 |
| 2025/0172852 | A1 * | 5/2025 | Puckett | G02F 1/365 |

OTHER PUBLICATIONS

Houe et al., "An introduction to methods of periodic poling for second-harmonic generation". Journal of Physics D: Applied Physics, vol. 28, No. 9, Sep. 14, 1995, pp. 1747 through 1763.

Cai et al., "Highly efficient broadband second harmonic generation mediated by mode hybridization and nonlinearity patterning in compact fiber-integrated lithium niobate nano-waveguides". Scientific Reports, Aug. 20, 2018, www.naure.com/scientificreports, pp. 1 through 9.

Parfenov et al., "Simulation of Ti-indiffused lithium noibate waveguides and analysis of their mode structure", Journal of Physics: Conference Series, vol. 741, (2016) 012141, pp. 1 through 6.

Wikipedia, "Periodic poling", as downloaded Oct. 17, 2023 from https://en.wikipedia.org/w/index.php?title=Periodic_poling&oldid=907005705, pp. 1 of 1.

* cited by examiner

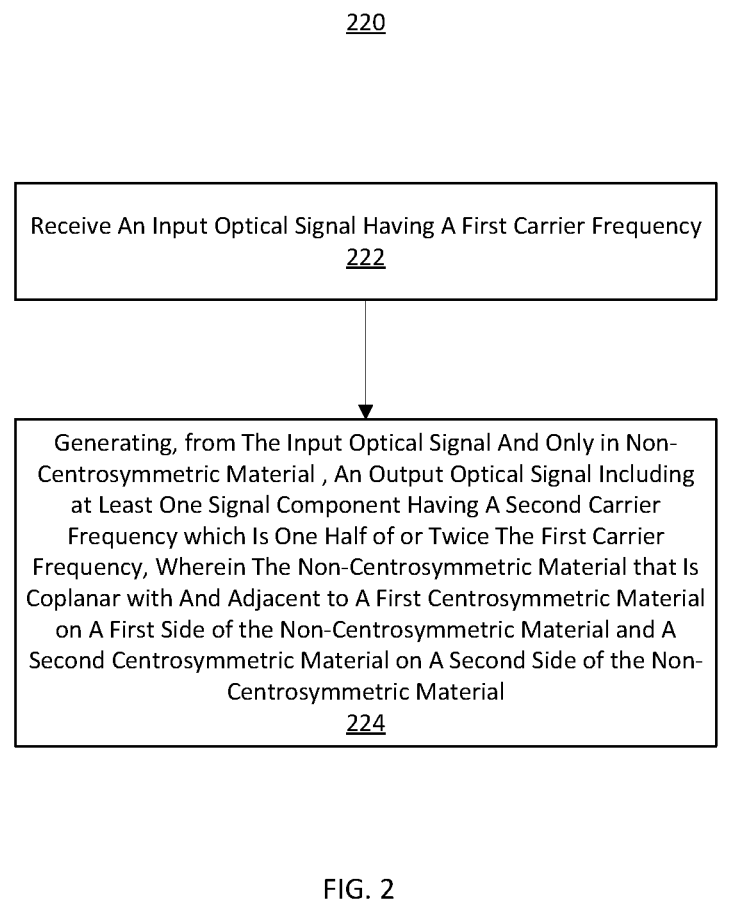

220

Receive An Input Optical Signal Having A First Carrier Frequency
222

Generating, from The Input Optical Signal And Only in Non-Centrosymmetric Material , An Output Optical Signal Including at Least One Signal Component Having A Second Carrier Frequency which Is One Half of or Twice The First Carrier Frequency, Wherein The Non-Centrosymmetric Material that Is Coplanar with And Adjacent to A First Centrosymmetric Material on A First Side of the Non-Centrosymmetric Material and A Second Centrosymmetric Material on A Second Side of the Non-Centrosymmetric Material
224

FIG. 2

APPARATUS AND METHOD FOR OPTICAL FREQUENCY CONVERSION

STATEMENT REGARDING FEDERALLY SPONSORED RESEARCH OR DEVELOPMENT

This invention was made with Government support. The Government has certain rights in the invention.

BACKGROUND

Optical frequency converters are used for a variety of technological systems including communications systems and measurement systems. Optical frequency converters may be made with waveguides using periodic poling or ion diffused waveguides. https://en.wikipedia.org/wiki/Periodic_poling (Oct. 11, 2023); Parfenov, M., et al. "Simulation of Ti-indiffused lithium niobate waveguides and analysis of their mode structure." *Journal of Physics: Conference Series*, Vol. 741. No. 1. IOP Publishing, 2016. The references cited above are hereby incorporated by reference herein. Waveguides made with periodic poling are complicated and expensive to manufacture. Ion diffused waveguides are larger than waveguides using periodic poling and have lower conversion efficiency.

SUMMARY

In some aspects, the techniques described herein relate to an optical frequency converter configured to at least one of: double a carrier frequency of an input optical signal and halve the carrier frequency of the input optical signal, the optical frequency converter including: a substrate including a surface; cladding on or over the surface of the substrate; a core including non-centrosymmetric non-linear crystalline material, a first portion of centrosymmetric non-linear crystalline material, and a second portion of the centrosymmetric non-linear crystalline material; wherein the core is over the surface of the substrate; wherein the non-centrosymmetric non-linear crystalline material is between the first portion of the centrosymmetric non-linear crystalline material and the second portion of the centrosymmetric non-linear crystalline material; wherein the non-centrosymmetric non-linear crystalline material, the first portion of the centrosymmetric non-linear crystalline material and the second portion of the centrosymmetric non-linear crystalline material are in a plane; wherein the plane is parallel to the surface; wherein the core is in the cladding; wherein the cladding has an index of refraction lower than the index of refraction of the core.

In some aspects, the techniques described herein relate to a method of manufacturing an optical frequency converter configured to at least one of double and/or halve a carrier frequency of an input optical signal, the method including: forming a first insulator on a substrate; forming a patterned non-centrosymmetric non-linear crystalline material over a portion of a surface of the first insulator; forming a first centrosymmetric non-linear crystalline material and a second centrosymmetric non-linear crystalline material from portions of the patterned non-centrosymmetric non-linear crystalline material, wherein each of the first centrosymmetric non-linear crystalline material and the second centrosymmetric non-linear crystalline material is adjacent to a different side of a remaining portion of the patterned non-centrosymmetric non-linear crystalline material; and forming a second insulator over exposed surfaces of the first insulator, the first and the second centrosymmetric non-linear crystalline material, and the remaining portion of the patterned non-centrosymmetric non-linear crystalline material.

In some aspects, the techniques described herein relate to a method of operation of an optical frequency converter cladding, a core including non-centrosymmetric non-linear crystalline material, a first portion of centrosymmetric non-linear crystalline material, and a second portion of the centrosymmetric non-linear crystalline material, wherein the non-centrosymmetric non-linear crystalline material is between the first portion and the second portion, wherein the core is in the cladding, wherein the cladding has an index of refraction lower than the index of refraction of the core, the method including: receiving, at a first port of the optical frequency converter, an input optical signal in a transverse electric or magnetic mode and having a first carrier frequency; and generating, from the input optical signal and only in the non-centrosymmetric non-linear crystalline material, an output optical signal in respectively a transverse electric or magnetic mode and including at least one signal component having a second carrier frequency which is one half of or twice the first carrier frequency; wherein an order of the transverse electric or magnetic mode of the input optical signal is higher than an order of respectively the transverse electric or magnetic mode of the output optical signal.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 illustrates a flow diagram of an exemplary method of generating, from an input optical signal, at least one component of an output optical signal having a carrier frequency that is one half or double the carrier frequency of the input optical signal.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
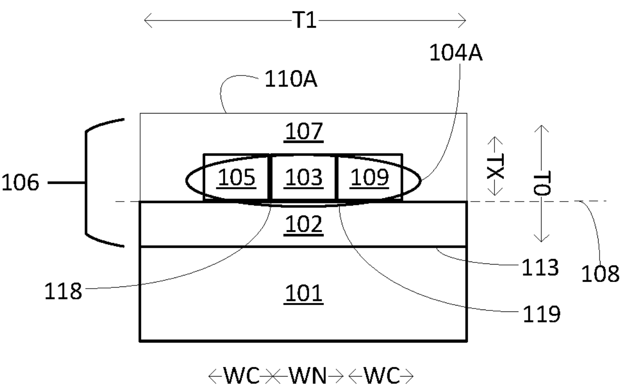
FIG. 1A illustrates a diagram of a cross section of one embodiment of an optical frequency converter which functions as an optical frequency doubler and/or an optical frequency halver.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, each method presented in the drawing figures and the specification is not to be construed as limiting the order in which the individual steps may be performed. The following detailed description is not to be taken in a limiting sense.

An optical frequency converter is disclosed herein which is formed from optical waveguide and which functions as an optical frequency doubler and/or an optical frequency halver. The optical frequency halver is configured to reduce the frequency by one half.

The input and output optical signals described herein may be respectively transverse electrical (TE) or transverse magnetic (TM) mode optical signals. For pedagogical purposes, the input and output optical signals may be illustrated as transverse electric mode optical signals. The input optical signal provided to the optical frequency converter is a higher order transverse electrical or magnetic mode than the respectively transverse electric or magnetic mode of the output optical signal. Optionally, the mode of the input optical signal is TE2 mode, and the mode of the output electrical signal is TE0 mode.

The optical frequency converter comprises a core, cladding material, and a substrate. The core is surrounded by the cladding material. The cladding material has an index of refraction that is lower than the index of refraction of the core. At least one surface of the cladding material is on, e.g., is supported by, the substrate.

The core includes a first core portion of non-linear crystalline material which is non-centrosymmetric, and a second core portion and a third core portion of the non-linear crystalline material each of which is centrosymmetric. The first, the second, and the third core portions are coplanar with the first core portion between the second and the third core portions. A first sidewall of the first core portion is adjacent to a sidewall of the second core portion. A second core sidewall (which is opposite the first sidewall) of the first core portion is adjacent to a sidewall of the third core portion. Each of the side walls is substantially perpendicular (or orthogonal) to the surface 113 of the substrate 101.

Centrosymmetric means symmetric around a central point. Centrosymmetric non-linear crystalline material does not have second order non-linearities, and thus are not configured to generate, from an input optical signal, an output optical signal comprising at least one signal component. having a carrier frequency that is one half or twice the carrier frequency of the input optical signal.

If the second and the third core portions were formed by non-centrosymmetric non-linear crystalline material, higher order optical modes would be generated in the second and the third core portions which would destructively interfere with the frequency halving and/or doubling generated in the first core portion. Such destructive interference would undesirably diminish conversion efficiency of the optical frequency converter.[1] To enhance optical frequency converter efficiency, only a central region, e.g., the first core portion can be made from non-centrosymmetric non-linear crystalline material. The other regions of the core surrounding the first portion of the core must be made of material that is not non-centrosymmetric.

[1]Conversion efficiency means a power of the optical output signal provided by the optical frequency converter divided by a power of the optical input signal received by the optical frequency converter.

The first, second, and third portions of the core are illustrated herein as being initially formed from one type of material. Alternatively, the portions that are centrosymmetric may be initially formed from material which is different than the portion that is centrosymmetric; however, the material forming each portion must have an index of refraction greater than the index of refraction of the cladding.

Optionally, the second and the third core portions are formed by centrosymmetric non-linear crystalline material, e.g., by converting non-centrosymmetric non-linear crystalline material to centrosymmetric non-linear crystalline material. The resulting frequency converter whose exemplary embodiments are disclosed herein is more compact and has higher conversion efficiency than the ion diffused waveguide and is more cost effective to manufacture than a waveguide using periodic poling.

FIG. 1A illustrates a diagram of a cross section of one embodiment of an optical frequency converter 110A which functions as an optical frequency doubler and/or an optical frequency halver. The optical frequency converter is formed as an optical waveguide including a cladding 106 on or over a substrate 101 and a core 104A in the cladding. Optionally, the cladding is 106 formed by a first or lower cladding portion 102 on or over, e.g., the surface 113 of, the substrate 101, and a second or upper cladding portion 107 on or over the first or lower cladding portion 102.

The substrate 101 may be an insulator, e.g., glass and/or sapphire, or a semiconductor, e.g., silicon and/or lithium niobate. The cladding 106 (and portions thereof) may be any material having an index of refraction lower than the index of refraction of the core 104A. Optionally, the cladding 106 may be formed by two or more portions of cladding; optionally, each portion of cladding may be formed from different material.[2] Optionally, the cladding 106 may be silicon dioxide.

[2]For pedagogical purposes, the cladding 106 is illustrated as being formed by a first cladding portion 102 formed on or over the substrate 101 and a second cladding portion 107 formed on or over the core 104A and the first cladding portion 102, e.g., on or over an exposed surface of the first cladding portion 102 on or over which the cored 104 does not reside.

The core 104A is in the cladding 106. Optionally, the core 104A is on or over the first cladding portion 102 and under the second cladding portion 107.

The core 104A includes (a) the first core portion 103 of the core 104A and which is non-centrosymmetric non-linear crystalline material and (b) the second core portion 105 and the third core portion 109 which are each centrosymmetric non-linear crystalline material. The first core portion 103, of the core 104A and which includes non-centrosymmetric non-linear crystalline material, has a first side 118 opposite a second side 119; the first and the second sides 118, 119 are orthogonal to a surface 113, of the substrate 101, on or over which the cladding 106, e.g., the lower cladding portion 102, resides. The first core portion 103, the second core portion 15, and the third core portion 109 are coplanar, i.e., are in the same plane. Optionally, each of the first core portion 103, the second core portion 105, and the third core portion consists of one of lithium niobate, lithium tantalate, and potassium niobate.

Optionally, the width WC of each of the second and third core portions 105, 109 is equal to a width WN of the first core portion 103.[3] The width of each core portion is along an axis 108 parallel to the surface 113 of the substrate. Optionally, the optical frequency converter (e.g., the cladding) width T2 is about three times or more than the optical frequency converter (e.g., the cladding and core) height TO, e.g., the height of the cladding 106.

[3]For pedagogical purposes, the width WC of each of the second and the third core portions 105, 109 are illustrated herein as being equal. Alternatively, the widths of each of the second and the third core portions 105, 109 may be different.

If the second core portion 105 and the third core portion 109 were each non-centrosymmetric non-linear crystalline material, then side lobes of the higher order TE mode optical input signal in the second core portion 105 and the third core portion 109 would destructively interfere with the main lobe of the higher order TE mode optical input signal in the first core portion 103 and reduce optical frequency converter conversion efficiency. Such destructive interference is mitigated by converting the non-centrosymmetric non-linear crystalline material of the second and third core portions to centrosymmetric non-linear crystalline material.

Figure 1B:
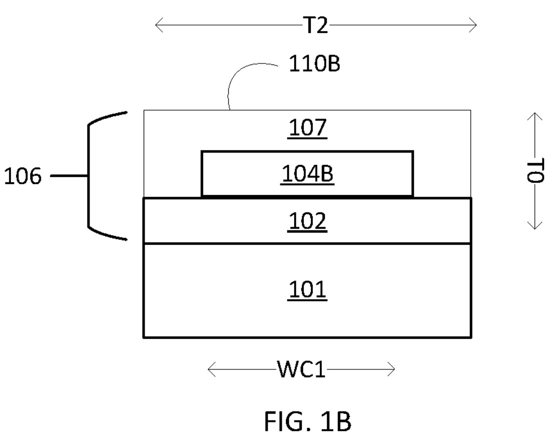
FIG. 1B illustrates a diagram of a cross section of one embodiment of an optical waveguide configured to be used with the optical frequency converter.

FIG. 1B illustrates a diagram of a cross section of one embodiment of an optical waveguide 110B configured to be used with the optical frequency converter. The optical waveguide 110B may be utilized as illustrated subsequently in FIG. 1C. The optical waveguide 110B is similar to the optical frequency converter 110A except that a core 104B of the optical waveguide 110B is formed solely by centrosymmetric non-linear crystalline material. The core 104B of the optical waveguide 110B has a width WC1. Optionally, a first second optical waveguide is used to couple the input optical signal to the optical frequency converter 110A, and a second optical waveguide is used to couple the output optical signal from the optical frequency converter 110A (or vice versa) may have other structures. Optionally, the optical waveguide (e.g., the cladding) width T2 is about three times the optical waveguide (e.g., the core and cladding) height T0.[4] The index of refraction of the cladding 106 is lower than the index of refraction of the core 104B.

[4]For pedagogical purposes, the optical frequency converter height and the optical waveguide height are illustrated as being equal; however, the two heights need not be equal.

Figure 1C:
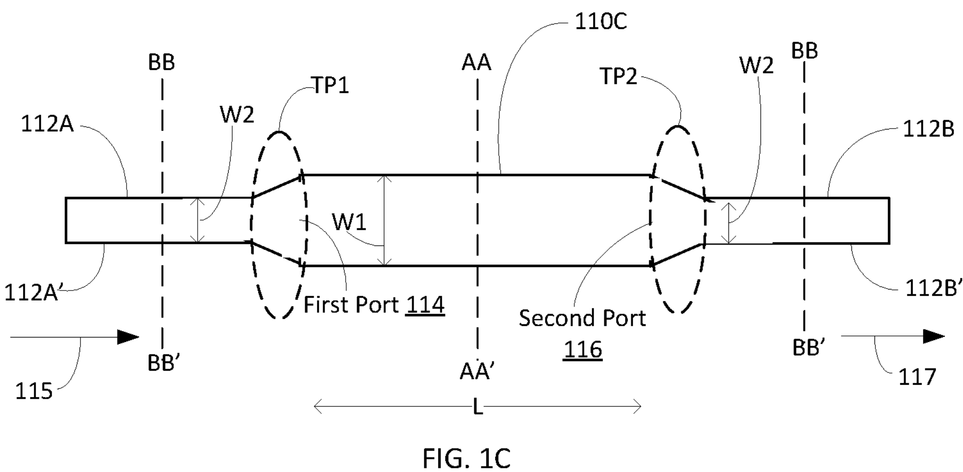
FIG. 1C illustrates a diagram of a plan view of one embodiment of an optical frequency converter with an optional first optical waveguide adjacent to a first port of the optical frequency converter and an optional second optical waveguide adjacent to a second port of the optical frequency converter.

FIG. 1C illustrates a diagram of a plan view of one embodiment of an optical frequency converter 110C with an optional first optical waveguide 112A adjacent to a first port 114 of the optical frequency converter 110C and an optional second optical waveguide 112B adjacent to a second port 116 of the optical frequency converter 110C. The first port 114 or the second port 116 is configured to receive an input optical signal 115, e.g., of a higher order TE mode, for example the TE2 mode.

The optical frequency converter 110A, 110C is a reciprocal optical device. The first port 114 may be an input or an output of the optical frequency converter 110C. The second port 116 may be respectively the output or the input of the optical frequency converter 110C. Optionally, the carrier wavelength of the input optical signal may be 775 nm and the carrier wavelength of the output optical signal may be 1550 nm. Optionally, the carrier wavelength of the input optical signal may be 1550 nm and the carrier wavelength of the output optical signal may be 775 nm.

Optionally, the optical frequency converter 110C is implemented according to the embodiment illustrated by FIG. 1A and the description therefore. In such a case, the cross section illustrated in FIG. 1A would be found at a cross section, e.g., at line AA-AA'. The optical frequency converter 110C has a width W1 which may be a width of one end of each of a first transition portion TP1 at the first port 114 and a second transition portion at the second port 116 as discussed elsewhere herein. The optical frequency converter 110C has a length L.

The non-centrosymmetric non-linear crystalline material of the optical frequency converter 110C is configured to generate an output optical signal 117 provided at respectively the second port 116 or the first port 114. The output optical signal comprises a component having a carrier frequency that is one half the carrier frequency of the input optical signal or twice the carrier frequency of the input optical signal.

The optional first optical waveguide 112A and the optional second optical waveguide 112B optionally may be implemented according to the embodiment illustrated in FIG. 1B. In such a case, the cross section illustrated in FIG. 1A would be found at a cross section, e.g., at lines BB-BB'. A portion 112A', 112B', of each of the optional first and second optical waveguides 112A, 112B, is connected to a corresponding transition portion TP1, TP2.

Optionally, the portion 112A' of the optional first optical waveguide 112A, e.g., the cladding of the portion 112A', and the portion 112B' of the optional second optical waveguide 112B, e.g., the cladding of the portion 112B', each have a width W2.[5] Optionally, the width W2 of the each portion 112A', 112B', e.g., each portion's cladding, is different, e.g., smaller, than the width W1 of the optical frequency converter 110C, e.g., the optical frequency converter's cladding.

[5]For pedagogical purposes, the width of each portion 112A', 112B' of the optional first and the second optical waveguides 112A, 112B is illustrated as being equal. However, the widths of each portion 112A', 112B' of each of the optional first and second optical waveguide may be different.

Optionally, a first transition portion TP1 and/or a second transition portion TP2 may be used to avoid a discontinuity when respectively connecting the optional first optical waveguide 112A to the first port 114 and the second optical waveguide 112B to the second port 116. Thus, the illustrated optional first and the second optical waveguides 112A, 112B each include a transition portion TP1, TP2 having a tapered width so that a width of cladding of the optional first optical waveguide 112A at the first port 114 equals a width of cladding of the optical frequency converter 110C at the first port 114 and the width of cladding of the optional second optical waveguide 112B at the second port 116 equals a width of cladding of the optical frequency converter 110C at the second port 116. Each transition portion TP1, TP2 may be formed from only centrosymmetric non-linear crystalline material with a cross section similar to that illustrated in FIG. 1B. The sidewall tapers of each transition portion TP1, TP2 may be linear or non-linear.

FIG. 2 illustrates a flow diagram of an exemplary method 220 of generating, from an input optical signal, at least one component of an output optical signal having a carrier frequency that is one half or double the carrier frequency of the input optical signal. To the extent the methods herein are described herein as being implemented with one or more of the apparatuses illustrated in FIGS. 1A-1C, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). Optionally, the method 220 is implemented with one or more of the apparatuses illustrated in FIGS. 1A-1C, or a portion of one or more thereof.

In block 222, an input optical signal, in a mode (e.g., a TE or TM mode) and having a first carrier frequency, is received by a first port of the optical frequency converter. Optionally, the input optical signal is received from a first optical waveguide.

In block 224, an output optical signal in another mode (e.g., another respectively TE or TM mode) is generated from the input optical signal. The output optical signal includes at least one signal component having a second carrier frequency that is one half or twice the carrier frequency of the input optical signal. The order of the mode (e.g., TE2) of the input optical signal is higher than an order of the mode (e.g., TE0) of the output optical signal. The output optical signal is generated only in non-centrosymmetric non-linear crystalline material (e.g., the first core portion) of the optical frequency converter that is coplanar and adjacent to (a) a first centrosymmetric non-linear crystalline material on a first side of the non-centrosymmetric non-linear crystalline material (e.g., the second core portion) and (b) a second centrosymmetric non-linear crystalline material on a second side of the non-centrosymmetric non-linear crystalline material (e.g., the third core portion). Optionally, the output optical signal is provided to a second optical waveguide.

Figure 3:
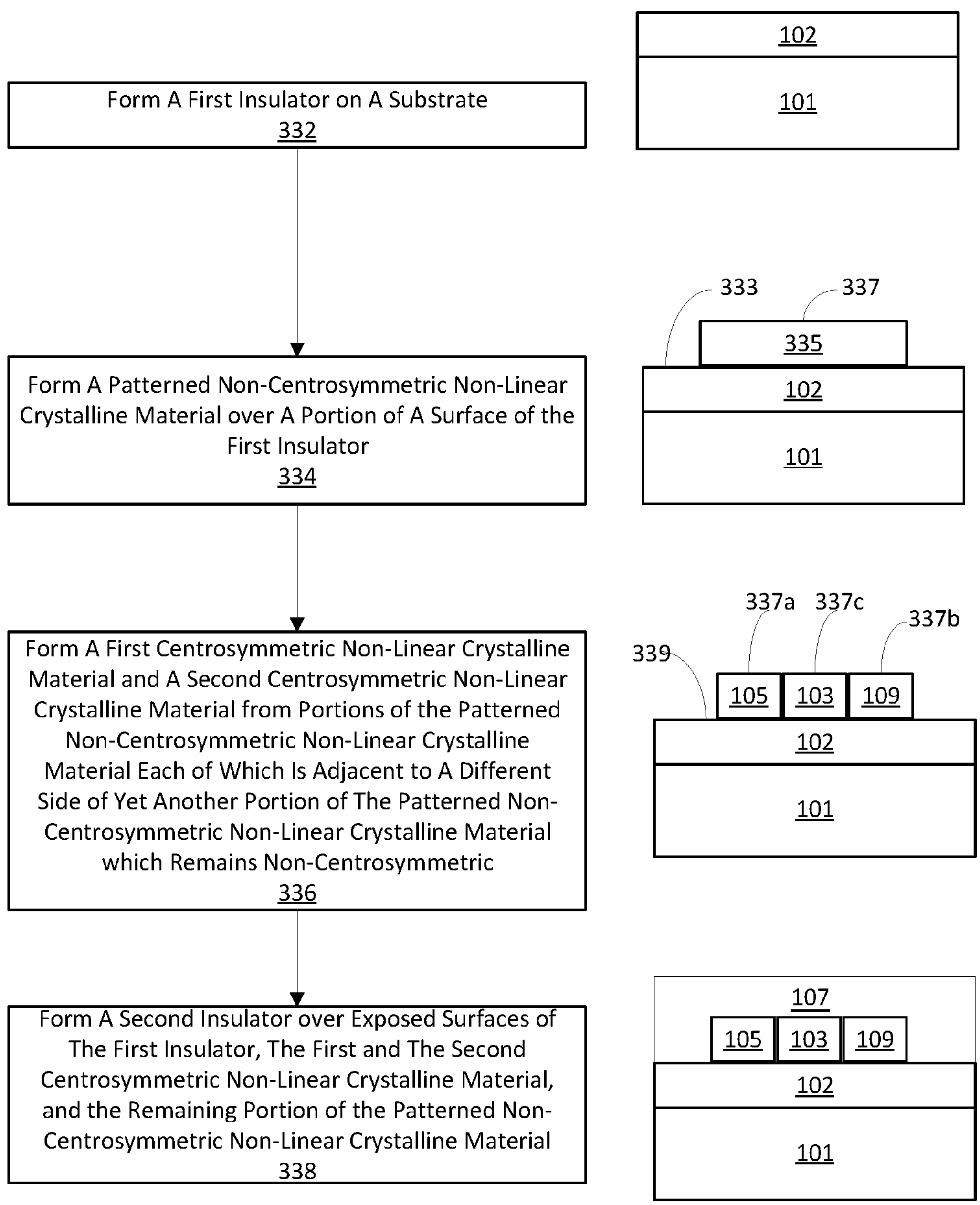
FIG. 3 illustrates a flow diagram of an exemplary method of fabricating an optical frequency converter which functions as an optical frequency doubler and/or an optical frequency halver.

FIG. 3 illustrates a flow diagram of an exemplary method 330 of fabricating an optical frequency converter which functions as an optical frequency doubler and/or an optical frequency halver. In block 332, a first insulator, i.e., the lower cladding portion 102, is formed over the substrate 101. Optionally, the insulator may be formed by deposition or growth.

In block 334, a patterned non-centrosymmetric non-linear crystalline material 335 is formed over a portion of a surface 333 of the first insulator which is parallel to a surface 113 of the substrate 101 on or over which the first insulator is formed. Optionally, such formation may be performed by bonding on-centrosymmetric non-linear crystalline material to the surface 333 of the first insulator and patterning (e.g., with photoresist, lithography, and etching) the bonded non-centrosymmetric non-linear crystalline material; thus, the patterned non-centrosymmetric non-linear crystalline material is over only a portion of the surface of the first insulator.

In block 336, a first centrosymmetric non-linear crystalline material (e.g., the second core portion 105) and a second centrosymmetric non-linear crystalline material (e.g., the third core portion 109) are formed from portions of the patterned non-centrosymmetric non-linear crystalline material 335. As discussed elsewhere herein, each of the first centrosymmetric material and the second centrosymmetric non-linear crystalline material is adjacent to a different side of a remaining portion 103 of the patterned non-centrosymmetric non-linear crystalline material. The remaining portion 103, first centrosymmetric material, and the second centrosymmetric non-linear crystalline material are respectively also referred to herein as the first core portion 103, second core portion, and the third core portion 109. Optionally, the first centrosymmetric material and the second centrosymmetric non-linear crystalline material are formed by patterning photoresist (e.g., using lithography) on a surface 337 of the patterned non-centrosymmetric material non-linear crystalline material 335, and subjecting two exposed portions (i.e., not covered by photoresist of the surface 337 that are not covered by photoresist to proton exchange and/or ion bombardment, e.g., to replace lithium ions with hydrogen ions[6]; such portion of the patterned non-centrosymmetric material non-linear crystalline material 335 exposed to the proton exchange and/or ion bombardment become centrosymmetric material non-linear crystalline material. Upon completion of the proton exchange and/or the ion bombardment, the photoresist is removed. The portion of the patterned non-centrosymmetric material non-linear crystalline material 335 whose surface was covered by the photoresist remains unaffected by the proton exchange and/or ion bombardment and thus non-centrosymmetric.

[6]The photoresist or a material (e.g., a metal or metal alloy) formed using the photoresist may be used to shield non-centrosymmetric non-linear crystalline material from ion bombardment and/or proton exchange.

In block 338, a second insulator (e.g., the second or upper cladding portion 107), is formed over an exposed surface 339 of the first insulator, exposed surfaces 337*a*, 337*b* of the first and the second centrosymmetric non-linear crystalline material (e.g., the second and the third core portions 105, 109), and the exposed surface 337*c* of the remaining portion of the patterned centrosymmetric non-linear crystalline material (e.g., the first core portion 103). Optionally, the second insulator may be formed by growth or deposition.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an optical frequency converter configured to at least one of: double a carrier frequency of an input optical signal and halve the carrier frequency of the input optical signal, the optical frequency converter comprising: a substrate comprising a surface; cladding on or over the surface of the substrate; a core comprising non-centrosymmetric non-linear crystalline material, a first portion of centrosymmetric non-linear crystalline material, and a second portion of the centrosymmetric non-linear crystalline material; wherein the core is over the surface of the substrate; wherein the non-centrosymmetric non-linear crystalline material is between the first portion of the centrosymmetric non-linear crystalline material and the second portion of the centrosymmetric non-linear crystalline material; wherein the non-centrosymmetric non-linear crystalline material, the first portion of the centrosymmetric non-linear crystalline material and the second portion of the centrosymmetric non-linear crystalline material are in a plane; wherein the plane is parallel to the surface; wherein the core is in the cladding; wherein the cladding has an index of refraction lower than the index of refraction of the core.

Example 2 includes the optical frequency converter of Example 1, further comprising: a first port configured to receive the input optical signal; a second port configured to provide an output optical signal comprising at least one signal component having a carrier frequency that is one half or twice the carrier frequency of the input optical signal; a first optical waveguide optically coupled to the first port and configured to provide the input optical signal to the first port; and a second optical waveguide optically coupled to the second port and configured to provide the output optical signal from the second port.

Example 3 includes the optical frequency converter of Example 2, wherein each of the first optical waveguide and the second optical waveguide comprise: the substrate; the cladding on or over the surface of the substrate; and another core consisting of the centrosymmetric non-linear crystalline material wherein the other core is over the surface of the substrate; wherein the other core is in the cladding; wherein the cladding has the index of refraction lower than an index of refraction of the other core.

Example 4 includes the optical frequency converter of Example 3, wherein the centrosymmetric non-linear crystalline material of the other core consists of one of: lithium niobate, lithium tantalate, and potassium niobate.

Example 5 includes the optical frequency converter of any of Examples 2-4, wherein the first and the second optical waveguides each include a transition portion having a tapered width so that a width of the cladding of the first optical waveguide at the first port equals a width of the cladding of the optical frequency converter at the first port and the width of cladding of the second optical waveguide at the second port equals a width of the cladding of the optical frequency converter at the second port.

Example 6 includes the optical frequency converter of Example 5, wherein a taper of the tapered width is linear or non-linear.

Example 7 includes the optical frequency converter of any of Examples 1-6, wherein a width of each of the non-centrosymmetric non-linear crystalline material, the first portion of the centrosymmetric non-linear crystalline material, and the second portion of the centrosymmetric non-linear crystalline material are equal, wherein each width is along an axis parallel to the surface of the substrate.

Example 8 includes the optical frequency converter of any of Examples 1-7, wherein each of the non-centrosymmetric non-linear crystalline material, the first portion of the centrosymmetric non-linear crystalline material, and the second portion of the centrosymmetric non-linear crystalline material consists of one of: lithium niobate, lithium tantalate, and potassium niobate.

Example 9 includes the optical frequency converter of any of Examples 1-8, wherein the substrate consists of an insulator.

Example 10 includes the optical frequency converter of any of Examples 1-9, wherein the cladding comprises: a first cladding portion on or over the surface of the substrate; and a second cladding portion on or over the core and the first cladding portion.

Example 11 includes the optical frequency converter of any of Examples 1-10, wherein the cladding comprises silicon dioxide.

Example 12 includes the optical frequency converter of any of Examples 1-11, wherein a width of the cladding is at least three times a height of the cladding.

Example 13 includes a method of manufacturing an optical frequency converter configured to at least one of double and/or halve a carrier frequency of an input optical signal, the method comprising: forming a first insulator on a substrate; forming a patterned non-centrosymmetric non-linear crystalline material over a portion of a surface of the first insulator; forming a first centrosymmetric non-linear crystalline material and a second centrosymmetric non-linear crystalline material from portions of the patterned non-centrosymmetric non-linear crystalline material, wherein each of the first centrosymmetric non-linear crystalline material and the second centrosymmetric non-linear crystalline material is adjacent to a different side of a remaining portion of the patterned non-centrosymmetric non-linear crystalline material; and forming a second insulator over exposed surfaces of the first insulator, the first and the second centrosymmetric non-linear crystalline material, and the remaining portion of the patterned non-centrosymmetric non-linear crystalline material.

Example 14 includes the method of Example 13, wherein forming the first insulator on the substrate comprises depositing the first insulator on the substrate or growing the first insulator on the substrate.

Example 15 includes the method of any of Examples 13-14, wherein forming the patterned non-centrosymmetric non-linear crystalline material over the portion of the surface of the first insulator comprises: bonding non-centrosymmetric non-linear crystalline material to the surface of the first insulator; and patterning the bonded non-centrosymmetric non-linear crystalline material so that the patterned non-centrosymmetric non-linear crystalline material is over only a portion of the surface of the first insulator.

Example 16 includes the method of any of Examples 13-15, wherein forming the first centrosymmetric non-linear crystalline material and the second centrosymmetric non-linear crystalline material from portions of the patterned non-centrosymmetric non-linear crystalline material comprises subjecting two exposed portions of a surface of the patterned non-centrosymmetric non-linear crystalline material to at least one of: proton exchange and ion bombardment.

Example 17 includes the method of any of Examples 13-16, wherein forming the second insulator over the exposed surfaces of the first insulator, the first and the second centrosymmetric non-linear crystalline material, and the remaining portion of the patterned non-centrosymmetric non-linear crystalline material comprises depositing the second insulator on the exposed surfaces of the first insulator, the first and the second centrosymmetric non-linear crystalline material, and the remaining portion of the patterned non-centrosymmetric non-linear crystalline material, or growing the second insulator on the exposed surfaces of the first insulator, the first and the second centrosymmetric non-linear crystalline material, and the remaining portion of the patterned non-centrosymmetric non-linear crystalline material.

Example 18 includes a method of operation of an optical frequency converter cladding, a core comprising non-centrosymmetric non-linear crystalline material, a first portion of centrosymmetric non-linear crystalline material, and a second portion of the centrosymmetric non-linear crystalline material, wherein the non-centrosymmetric non-linear crystalline material is between the first portion and the second portion, wherein the core is in the cladding, wherein the cladding has an index of refraction lower than the index of refraction of the core, the method comprising: receiving, at a first port of the optical frequency converter, an input optical signal in a transverse electric or magnetic mode and having a first carrier frequency; and generating, from the input optical signal and only in the non-centrosymmetric non-linear crystalline material, an output optical signal in respectively a transverse electric or magnetic mode and including at least one signal component having a second carrier frequency which is one half of or twice the first carrier frequency; wherein an order of the transverse electric or magnetic mode of the input optical signal is higher than an order of respectively the transverse electric or magnetic mode of the output optical signal.

Example 19 includes the method of Example 18, wherein the transverse electric (TE) or magnetic mode of the input optical signal is a TE2 mode and the respectively transverse electric or magnetic mode of the output optical signal is a TE0 mode.

Example 20 includes the method of Example 19, wherein the input optical signal is received from a first optical waveguide; wherein the output optical signal is provided to a second optical waveguide; wherein each of the input and the output optical waveguides comprises: the cladding; and another core consisting of the centrosymmetric non-linear crystalline material; wherein the other core is in the cladding; wherein the cladding has the index of refraction lower than the index of refraction of the other core.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical frequency converter configured to at least one of: double a carrier frequency of an input optical signal and halve the carrier frequency of the input optical signal, the optical frequency converter comprising:

a substrate comprising a surface;

cladding on or over the surface of the substrate; and a core comprising non-centrosymmetric non-linear crystalline material, a first portion of centrosymmetric non-linear crystalline material, and a second portion of the centrosymmetric non-linear crystalline material, wherein each of the first portion of the centrosymmetric non-linear crystalline material and the second portion comprises a non-linear crystalline material of the non-centrosymmetric non-linear crystalline material (a) in which ionic elements of the non-linear crystalline material have each been replaced by a proton and/or (b) with additional ions;

wherein the core is over the surface of the substrate;

wherein the non-centrosymmetric non-linear crystalline material is between the first portion of the centrosymmetric non-linear crystalline material and the second portion of the centrosymmetric non-linear crystalline material;

wherein the non-centrosymmetric non-linear crystalline material, the first portion of the centrosymmetric non-linear crystalline material and the second portion of the centrosymmetric non-linear crystalline material are in a plane;

wherein the plane is parallel to the surface;

wherein the core is in the cladding;

wherein the cladding has an index of refraction lower than an index of refraction of the core.

2. The optical frequency converter of claim 1, further comprising:

a first port configured to receive the input optical signal;

a second port configured to provide an output optical signal comprising at least one signal component having a carrier frequency that is one half or twice the carrier frequency of the input optical signal;

a first optical waveguide optically coupled to the first port and configured to provide the input optical signal to the first port; and a second optical waveguide optically coupled to the second port and configured to provide the output optical signal from the second port.

3. The optical frequency converter of claim 2, wherein each of the first optical waveguide and the second optical waveguide comprise:

the substrate;

the cladding on or over the surface of the substrate; and another core consisting of the centrosymmetric non-linear crystalline material wherein the other core is over the surface of the substrate;

wherein the other core is in the cladding;

wherein the cladding has the index of refraction lower than an index of refraction of the other core.

4. The optical frequency converter of claim 3, wherein the centrosymmetric non-linear crystalline material of the other core consists of one of: lithium niobate, lithium tantalate, and potassium niobate.

5. The optical frequency converter of claim 2, wherein the first and the second optical waveguides each include a transition portion having a tapered width so that a width of the cladding of the first optical waveguide at the first port equals a width of the cladding of the optical frequency converter at the first port and the width of cladding of the second optical waveguide at the second port equals a width of the cladding of the optical frequency converter at the second port.

6. The optical frequency converter of claim 5, wherein a taper of the tapered width is linear or non-linear.

7. The optical frequency converter of claim 1, wherein a width of each of the non-centrosymmetric non-linear crystalline material, the first portion of the centrosymmetric non-linear crystalline material, and the second portion of the centrosymmetric non-linear crystalline material are equal, wherein each width is along an axis parallel to the surface of the substrate.

8. The optical frequency converter of claim 1, wherein each of the non-centrosymmetric non-linear crystalline material, the first portion of the centrosymmetric non-linear crystalline material, and the second portion of the centrosymmetric non-linear crystalline material consists of one of: lithium niobate, lithium tantalate, and potassium niobate.

9. The optical frequency converter of claim 1, wherein the substrate consists of an insulator.

10. The optical frequency converter of claim 1, wherein the cladding comprises:

a first cladding portion on or over the surface of the substrate; and a second cladding portion on or over the core and the first cladding portion.

11. The optical frequency converter of claim 1, wherein the cladding comprises silicon dioxide.

12. The optical frequency converter of claim 1, wherein a width of the cladding is at least three times a height of the cladding.

13. A method of manufacturing an optical frequency converter configured to at least one of double and/or halve a carrier frequency of an input optical signal, the method comprising:

forming a first insulator on a substrate;

forming a patterned non-centrosymmetric non-linear crystalline material over a portion of a surface of the first insulator;

forming a first centrosymmetric non-linear crystalline material and a second centrosymmetric non-linear crystalline material from portions of the patterned non-centrosymmetric non-linear crystalline material, wherein each of the first centrosymmetric non-linear crystalline material and the second centrosymmetric non-linear crystalline material is adjacent to a different side of a remaining portion of the patterned non-centrosymmetric non-linear crystalline material; and forming a second insulator over exposed surfaces of the first insulator, the first and the second centrosymmetric non-linear crystalline material, and the remaining portion of the patterned non-centrosymmetric non-linear crystalline material.

14. The method of claim 13, wherein forming the first insulator on the substrate comprises depositing the first insulator on the substrate or growing the first insulator on the substrate.

15. The method of claim 13, wherein forming the patterned non-centrosymmetric non-linear crystalline material over the portion of the surface of the first insulator comprises:

bonding non-centrosymmetric non-linear crystalline material to the surface of the first insulator; and patterning the bonded non-centrosymmetric non-linear crystalline material so that the patterned non-centrosymmetric non-linear crystalline material is over only a portion of the surface of the first insulator.

16. The method of claim 13, wherein forming the first centrosymmetric non-linear crystalline material and the second centrosymmetric non-linear crystalline material from portions of the patterned non-centrosymmetric non-linear crystalline material comprises subjecting two exposed portions of a surface of the patterned non-centrosymmetric non-linear crystalline material to at least one of: proton exchange and ion bombardment.

17. The method of claim 13, wherein forming the second insulator over the exposed surfaces of the first insulator, the first and the second centrosymmetric non-linear crystalline material, and the remaining portion of the patterned non-centrosymmetric non-linear crystalline material comprises depositing the second insulator on the exposed surfaces of the first insulator, the first and the second centrosymmetric non-linear crystalline material, and the remaining portion of the patterned non-centrosymmetric non-linear crystalline material, or growing the second insulator on the exposed surfaces of the first insulator, the first and the second centrosymmetric non-linear crystalline material, and the remaining portion of the patterned non-centrosymmetric non-linear crystalline material.

18. A method of operation of an optical frequency converter cladding, a core comprising non-centrosymmetric non-linear crystalline material, a first portion of centrosymmetric non-linear crystalline material, and a second portion of the centrosymmetric non-linear crystalline material, wherein the non-centrosymmetric non-linear crystalline material is between the first portion and the second portion, wherein the core is in the cladding, wherein the cladding has an index of refraction lower than the index of refraction of the core, the method comprising:

receiving, at a first port of the optical frequency converter, an input optical signal in a transverse electric or magnetic mode and having a first carrier frequency; and generating, from the input optical signal and only in the non-centrosymmetric non-linear crystalline material, an output optical signal in respectively a transverse electric or magnetic mode and including at least one signal component having a second carrier frequency which is one half of or twice the first carrier frequency;

wherein an order of the transverse electric or magnetic mode of the input optical signal is higher than an order of respectively the transverse electric or magnetic mode of the output optical signal, and wherein each of the first portion of the centrosymmetric non-linear crystalline material and the second portion comprises a non-linear crystalline material of the non-centrosymmetric non-linear crystalline material (a) in which ionic elements of the non-linear crystalline material have each been replaced by a proton and/or (b) with additional ions.

19. The method of claim 18, wherein the transverse electric (TE) or magnetic mode of the input optical signal is a TE2 mode and the respectively transverse electric or magnetic mode of the output optical signal is a TE0 mode.

20. The method of claim 19, wherein the input optical signal is received from a first optical waveguide;

wherein the output optical signal is provided to a second optical waveguide;

wherein each of the input and the output optical waveguides comprises:

the cladding; and another core consisting of the centrosymmetric non-linear crystalline material;

wherein the other core is in the cladding;

wherein the cladding has the index of refraction lower than the index of refraction of the other core.

* * * * *